(12) United States Patent
Anscieau et al.

(10) Patent No.: US 8,826,799 B2
(45) Date of Patent: Sep. 9, 2014

(54) SINGLE EFFECT HYDRAULIC CYLINDER

(75) Inventors: Marc Anscieau, Lasserre (FR); Alain Bignolais, Leguevin (FR)

(73) Assignee: Airbus Operations S.A.S., Toulouse (FR)

( * ) Notice: Subject to any disclaimer, the term of this patent is extended or adjusted under 35 U.S.C. 154(b) by 699 days.

(21) Appl. No.: 13/074,629

(22) Filed: Mar. 29, 2011

(65) Prior Publication Data

US 2011/0239855 A1 Oct. 6, 2011

(30) Foreign Application Priority Data

Mar. 30, 2010 (FR) ...................................... 10 52330

(51) Int. Cl.
*F15B 15/26* (2006.01)
*F15B 15/20* (2006.01)
*F15B 20/00* (2006.01)
*B64D 29/00* (2006.01)

(52) U.S. Cl.
CPC .............. *F15B 15/204* (2013.01); *B64D 29/00* (2013.01); *F15B 20/004* (2013.01)
USPC .............................................. 91/357; 91/402

(58) Field of Classification Search
USPC ........................ 91/357, 402, 405, 407; 60/406
See application file for complete search history.

(56) References Cited

U.S. PATENT DOCUMENTS 2,893,209 A 7/1959 Colley
2003/0047899 A1 3/2003 Gibbs

FOREIGN PATENT DOCUMENTS

FR 1 124 969 10/1956
JP 59-23107 2/1984
WO WO 01/74612 A1 10/2001

OTHER PUBLICATIONS

French Preliminary Search Report issued Nov. 10, 2010, in French 1052330, filed Mar. 30, 2010 (with English Translation of Category of Cited Documents).

*Primary Examiner* — Michael Leslie
(74) *Attorney, Agent, or Firm* — Oblon, Spivak, McClelland, Maier & Neustadt, L.L.P.

(57) ABSTRACT

The invention belongs to the field of single-effect hydraulic cylinders. It relates to a device that makes it possible to limit the pressure in the pressurization chamber of a single-effect cylinder when the rod thereof is in a particular range of longitudinal positions of safety, while respecting the operating safety of the device, that is, in the case that the power supply of the pilot valves of the distributors and of the hydraulic pump is cut, the rod of the cylinder remains in its position if this position does not lie within the safety position range.

5 Claims, 4 Drawing Sheets

SINGLE EFFECT HYDRAULIC CYLINDER

The invention relates to the field of hydraulic cylinders. More precisely, the invention relates to single-effect hydraulic cylinders with telescoping rod.

In a common example of application, such cylinders are used to displace loads from one equilibrium position to another by overcoming the effect of gravity as a result of the force that they produce.

In conformity with standard practice and with the standard ISO 1219, unless otherwise indicated, the elements of automatic systems are represented as connected to the circuit in their non-activated or starting rest state.

In FIG. 1, these cylinders comprise a body (10), generally cylindrical, separated leaktightly into two chambers (101, 102) by a piston (11) linked to a rod (110). A hydraulic connector (12) makes it possible to place one of the chambers in communication with a hydraulic circuit. This hydraulic circuit, according to a simple exemplary embodiment, is a closed circuit comprising a tank (30) containing a hydraulic fluid, a pump (31) capable of raising the pressure and flow of the said fluid in the circuit, a hydraulic actuator, such as a single-effect cylinder (1), a first distributor (32), capable of placing the pump in communication with a second distributor (33), capable of placing the hydraulic circuit in communication with pressurization chamber (101) of cylinder (1).

In this example, the pump and the pilot valves of the distributors are supplied electrically.

When the electrical power of the assembly is turned on, the pump causes the pressure of the hydraulic fluid to rise and, because of the communication of distributors (32, 33), the hydraulic fluid is placed in communication with pressurization chamber (101) of the cylinder, which has the effect of displacing piston (11) in translation under a force proportional to the pressure and of displacing load (2) toward a position referred to as high position (22).

If the electrical supply is cut, the pump stops and distributors (32 and 33) return to their original position. The pressurization chamber is unable to be evacuated and rod (110) of the cylinder remains substantially in position, even while bearing the weight of the load.

By a change of state of second distributor (33), pressurization chamber (101) of the cylinder is placed in communication with tank (30) and is therefore able to be evacuated. Under the effect of its own weight, load (2) is displaced in opposite direction, pushing the hydraulic fluid contained in the pressurization chamber toward the tank. Advantageously, a flow restrictor or "constriction" (35), placed in return circuit (305), makes it possible to reduce the rate at which the load returns to its position referred to as low position (21). Hereinafter low position denotes the position that the load displaced by the cylinder would assume when this load is subjected to gravity in the absence of any urging by the cylinder.

According to this device, if an accidental electrical supply cut occurs while the load is being lifted toward the high position, the load becomes immobilized in position. Consequently, the device always returns to this configuration when it is not receiving electrical supply, regardless of whether this supply is provided by the a.c. system or by batteries.

In this configuration, in which the pressurization chamber is blocked off leaktightly, any attempt to modify the longitudinal position of the rod of the cylinder will cause a modification of the volume of hydraulic fluid trapped in this way and a restoring force proportional to the pressure change that this change of volume will produce in the hydraulic fluid. Since hydraulic fluids are said to be incompressible, this force will be very large, even for small displacements of the load.

Thus, when such a circuit is used solely to maneuver loads, for example in order to open a cowling, a hatch, a door, a lifting bridge or any other device whose weight is absorbed by mechanical bracing means or interlocks other than the cylinder in low position at the end of travel, this hydraulic restoring force induces parasitic forces that may damage the rod of the cylinder, the means for linking the said cylinder with the load, the means for interlocking or absorbing forces at the end of travel, or that may lead to uncontrolled dynamic effects. A known prior art solution consists in installing double control on the second distributor, so that its state can be changed, for example, by manual control when it is not being supplied electrically. In this case, when the cylinder arrives at the end of travel in low position and when the electrical supply is cut, the state of the second distributor is modified manually so as to place the pressurization chamber in communication with the tank. Such a solution is dangerous, because an untimely manual maneuver of the second distributor when the electrical supply is cut and when the load is in high position may cause the said load to fall.

A need therefore exists for limiting the pressure in the pressurization chamber of a single-effect cylinder when the rod thereof is in a particular position range close to the low position of the load, referred to as safety position, while respecting the operating safety of the device, that is, in the case that the power supply of the pilot valves of the distributors and of the hydraulic pump is cut, the rod of the cylinder remains in its position if this position does not lie within the safety range.

The said range is said to be the safety range because the distance between the load and its support or interlocking elements is so small that it is impossible for persons, limbs or objects to be located under the load in this zone.

Advantageously, this device must be capable of replacing an existing device without modification of the control logic of the said device.

French Patent FR 1603498 describes a cylinder comprising a device wherein, beyond an axial position at the end of travel of the rod, the piston is stopped against an annular segment housed in a slot of the body of the cylinder. This stopped position permits opening of a valve, which sends the hydraulic fluid supplying the pressurization chamber to the tank. Under the effect of the load applied to the rod of the cylinder and therefore to the piston, this then retracts and breaks the contact with the annular stop. The valve closes again and the pressure rises again in the pressurization chamber, stopping the travel of the cylinder. This device is an end-of-travel device that acts in high position of the load, and the limitation of the pressure in the chamber, by return of the hydraulic supply to the tank, when the cylinder arrives at the end of travel is merely a transient state.

Document JP 59023107 describes a multi-stage single-effect cylinder comprising a plurality of coaxial pistons, each having a limited axial travel, the total travel of the cylinder being the sum of the travels of each piston. For this purpose, the cylinder described in this document is provided with a plurality of orifices supplying fluid to the different pressurization chambers in synchronization with the advance of the successive pistons.

To overcome the inadequacies of the prior art, the invention proposes a single-effect hydraulic cylinder comprising:

A pressurization chamber acting on a piston capable of being displaced between two positions referred to as end-of-travel positions, A first orifice discharging into the said pressurization chamber regardless of the position of the piston and capable of placing the said chamber in communication with a hydraulic circuit, which orifice always is passing, A second orifice discharging into the said pressurization chamber regardless of the position of the piston and capable of placing this chamber in communication with a hydraulic circuit, which orifice is passing for a first range of position of the piston and closed for a second range of position of the piston, the limit between the two ranges being distinct from the ends of travel.

Thus the technical functions fulfilled by the particular characteristics of the cylinder constituting the object of the invention are specific to a single pressurization chamber, for controlling the advance of a single piston, the said pressurization chamber is in communication with two orifices, the second orifice being passing only for one range of position of the piston, which range makes it possible in particular to define a position range referred to as safety range. The passing or non-passing state of these two orifices is independent of the hydraulic circuit to which the cylinder is connected and in particular of the position of distributors or check valves external to the said cylinder, and it depends only on the position of the rod thereof. The circuit may be adapted according to the sought effect, the change of state of the second orifice being independent of the availability of control external to the cylinder, therefore independent of a cut of the electrical or hydraulic supply. In particular, by placing the second orifice in communication with the tank, the pressure is reduced in the pressurization chamber for a position of the rod of the cylinder close to the low position referred to as safety position, and the said cylinder no longer exerts reaction force opposing movements of the load. Beyond this safety position, the second orifice is not passing and is therefore isolated from the pressurization chamber.

Advantageously, the said cylinder comprises means capable of closing the second orifice regardless of the position of the piston when the pressurization chamber is supplied with pressurized hydraulic fluid via the first orifice. In this way, the said cylinder may be installed instead of and in place of an existing single-effect cylinder, without modifying the pilot-valve logic thereof, making it possible to apply a force to the load, including when this is in its low position.

According to an advantageous embodiment, the cylinder comprises a coupling capable of placing the two orifices in communication with a hydraulic circuit and means capable of switching the first orifice into communication with the said coupling. In this way the cylinder may be mounted instead of and in place of an existing cylinder by using only a single connection.

The switching means disposed on the cylinder may be used advantageously for manual control thereof by bypassing the control logic.

The invention will now be described more precisely in the context of preferred embodiments, in no way limitative, represented in FIGS. 1 to 7, wherein:

FIG. 1 schematically represents a single-effect cylinder and its control device according to the prior art;

FIG. 2 shows, again schematically, an embodiment of the invention in its position referred to as rest or low position;

FIG. 3 schematically illustrates the configuration of the device in a situation of raising or lowering of the load before the position referred to as safety position is attained;

Figure 5:
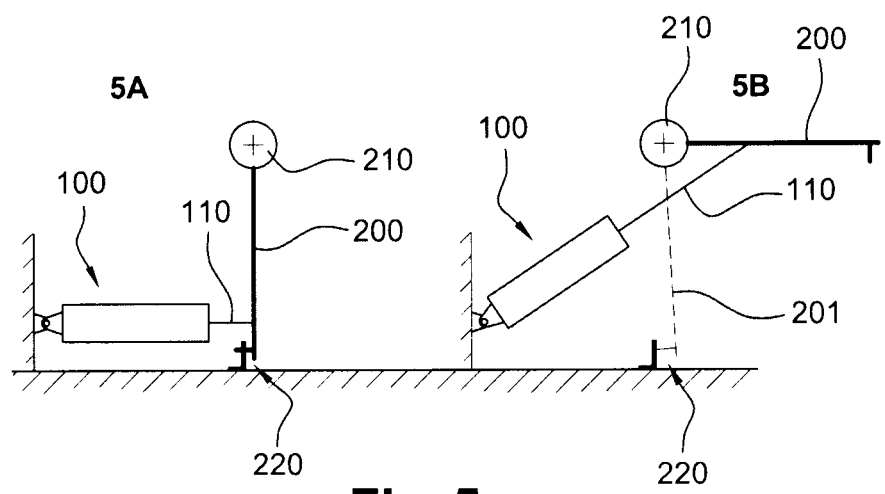
FIG. 5 illustrates an example of application of the cylinder according to the invention for opening a hatch or a cowling.
Figure 7:
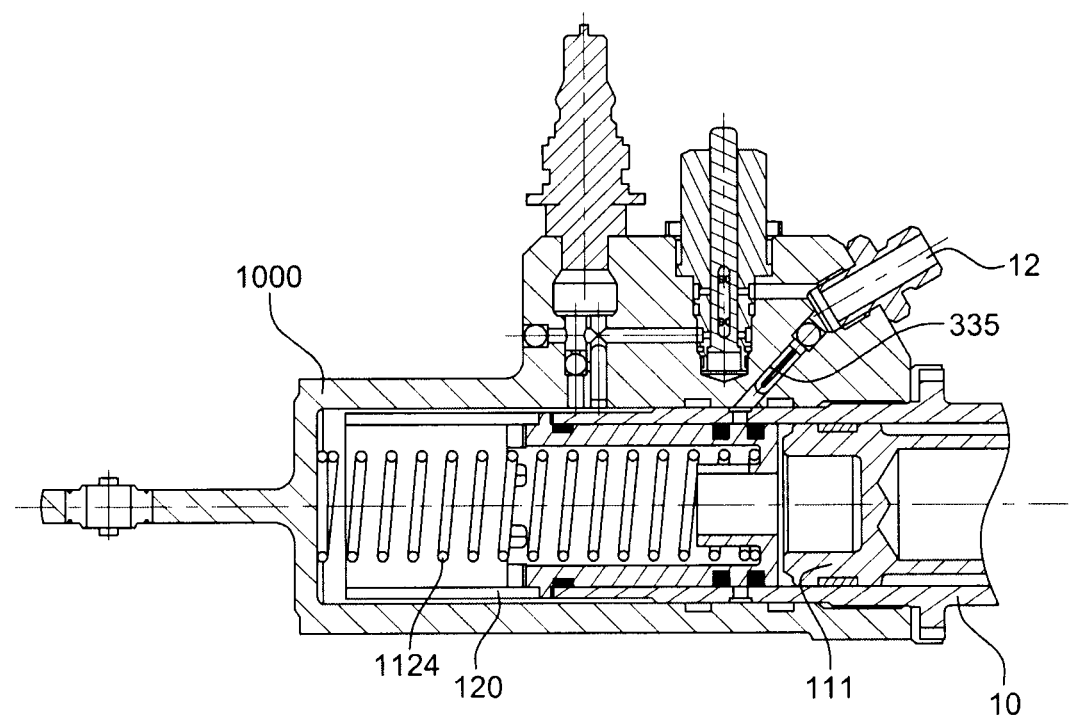

And FIGS. 5 and 7 represent in partial view an exemplary embodiment in longitudinal section, integrating all of the functions in one block at the end of the body of the cylinder.

Figure 1:
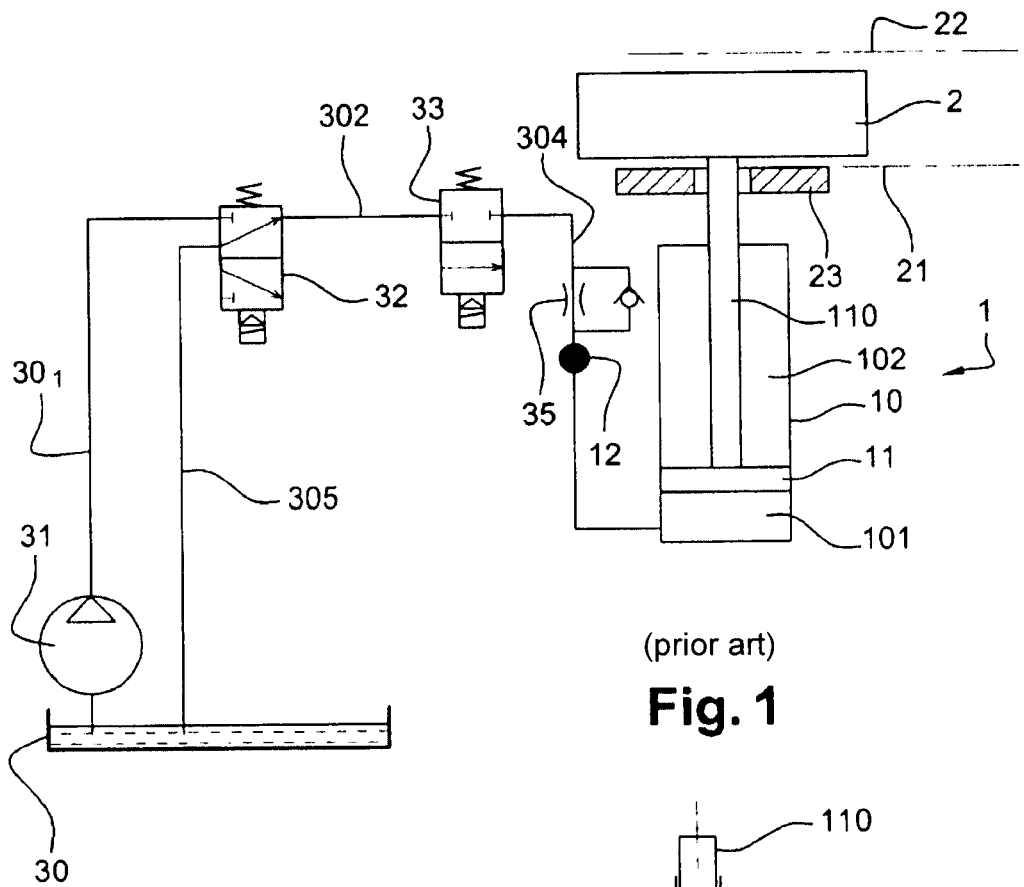

FIG. 1, relating to the prior art, describes a control circuit of a single-effect telescopic cylinder (1), assigned to the displacement of a heavy mass (2) between two extreme positions (21, 22) comprising a position referred to as low position (21), in which mass (2) rests on a support absorbing the weight thereof.

Cylinder (1) comprises a cylindrical body (10), separated leaktightly into two chambers (101, 102) by a piston (11), which is linked to a rod (110) that acts on mass (2).

One of the chambers of the cylinder, referred to as pressurization chamber (101), is in communication with a hydraulic circuit via a coupling (12).

The said hydraulic circuit comprises a hydraulic fluid reservoir or tank (30) and a hydraulic pump (31) capable of causing the fluid to circulate in the said circuit.

The circuit also comprises two distributors (32, 33), whose state may be changed when their pilot valve is electrically supplied. To bring about displacement of mass (2) from its low position (21) to its high position (22), hydraulic pump (31) being in operation and distributors (32, 33) being supplied electrically, the hydraulic fluid occupies a first circuit section (301) as far as first distributor (32). Since the latter is being electrically supplied, it places first circuit section (301) in communication with a second circuit section (302), which in turn is in communication with second distributor (33). Since this is being supplied electrically, it places this second circuit section (302) in communication with hydraulic coupling (12) of cylinder (1) via a fourth circuit section (304), which coupling (12) is passing and permits the pressurized hydraulic fluid to penetrate into pressurization chamber (101), with the effect of causing translation of piston (11).

When mass (2) has arrived at the desired position, the electrical supply is interrupted, thus having the effect of stopping the pump and blocking off fourth circuit section (304). The cylinder remains in its position.

To bring about lowering of the mass toward its low position (21), second distributor (33) is supplied electrically, with the effect of placing fourth circuit section (304) in communication with second circuit section (302), which is in communication with tank (30) via a fifth circuit section (305). In this way, pressurization chamber (101) is evacuated and piston (11) retracts under the effect of the weight of mass (2).

Figure 2:
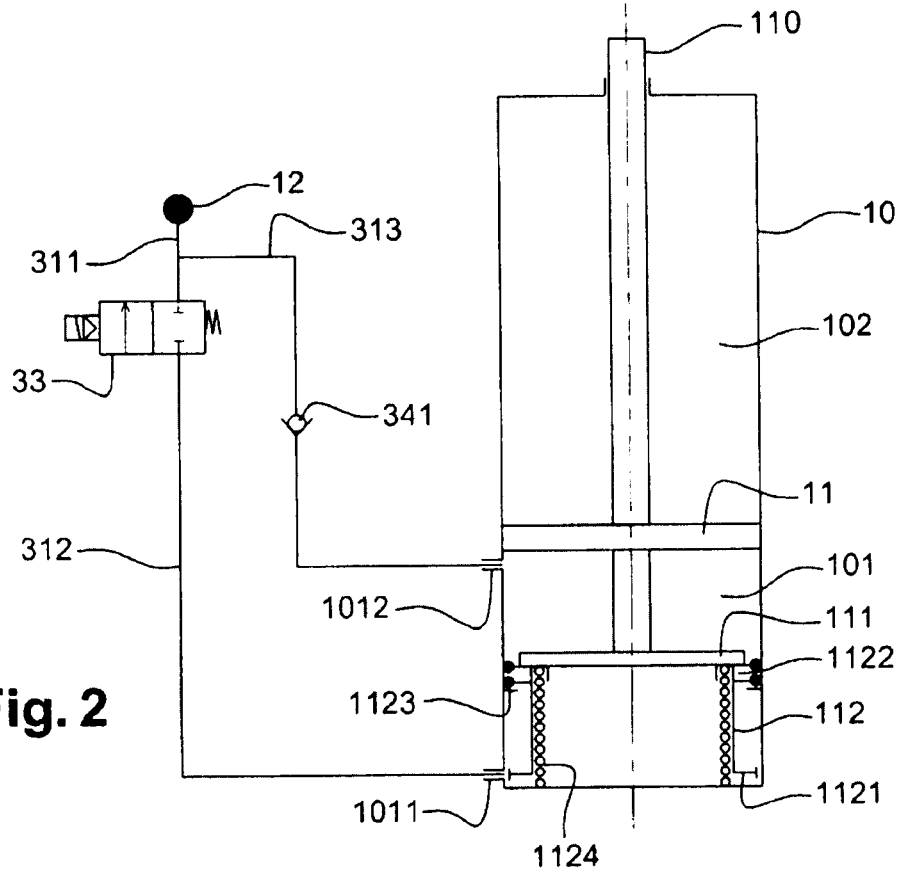

In FIG. 2, to overcome the inadequacies of the prior art, the invention proposes a cylinder (100), which can be connected instead of and in place of cylinder (1) according to the prior art via an equivalent hydraulic connector (12), by making only minor modifications to the circuit and preserving the safety of its operation.

According to one embodiment, the cylinder comprises a substantially cylindrical body (10), separated leaktightly into two chambers (101, 102) by a piston (11), which is linked to a rod (110) acting on the mass, and to a thruster (111) acting on movable means (112) in pressurization chamber (101).

According to this embodiment, the said movable means comprise a substantially cylindrical bushing (112) extending along the axis of the cylinder and capable of sliding along this axis into the body of the cylinder and comprising, on the thruster side, a groove (1122) that is leaktight relative to the interior walls of body (10) of the cylinder and, at its other end, means for guiding the said bushing into the body of the cylinder, the said guide means also making it possible to stop the translation of the said bushing against an axial stop (1123). Spring-forming means (124) make it possible to press the end of bushing (112) against thruster (111) when this is not at the axial stop.

Pressurization chamber (101) is in communication with the hydraulic circuit via two orifices (1011, 1012). First orifice (1011) is always passing. Second orifice (1012) is blocked off when leaktight groove (1122) of bushing (112) is opposite the said orifice, as is the case when the said bushing is at the axial stop.

The original circuit is slightly modified by placing distributor (33) downstream from connector (12). The operation is substantially the same and the control logic is not modified. Starting from the low position, FIG. 2, pump (31) and distributors (32, 33) are supplied electrically. The hydraulic fluid occupies circuit section (311) between coupling (12) and second distributor (33), which places it in communication with circuit section (312), which leads the said fluid into pressurization chamber (101) via first orifice (1011). The pressurized fluid also occupies circuit section (313) between coupling (12) and second orifice (1012). The fluid is nevertheless stopped in this section (313) by a check valve (341). The pressure applied to the said valve closes it, also preventing passage of the fluid from second orifice (1012) toward coupling (12). The pressure rises in pressurization chamber (101) and piston (11) of the cylinder is displaced, raising load (2), in its travel entraining thruster (111). Movable bushing (112), pressed against the said thruster by spring-forming means (1124), accompanies this translation movement.

Figure 3:
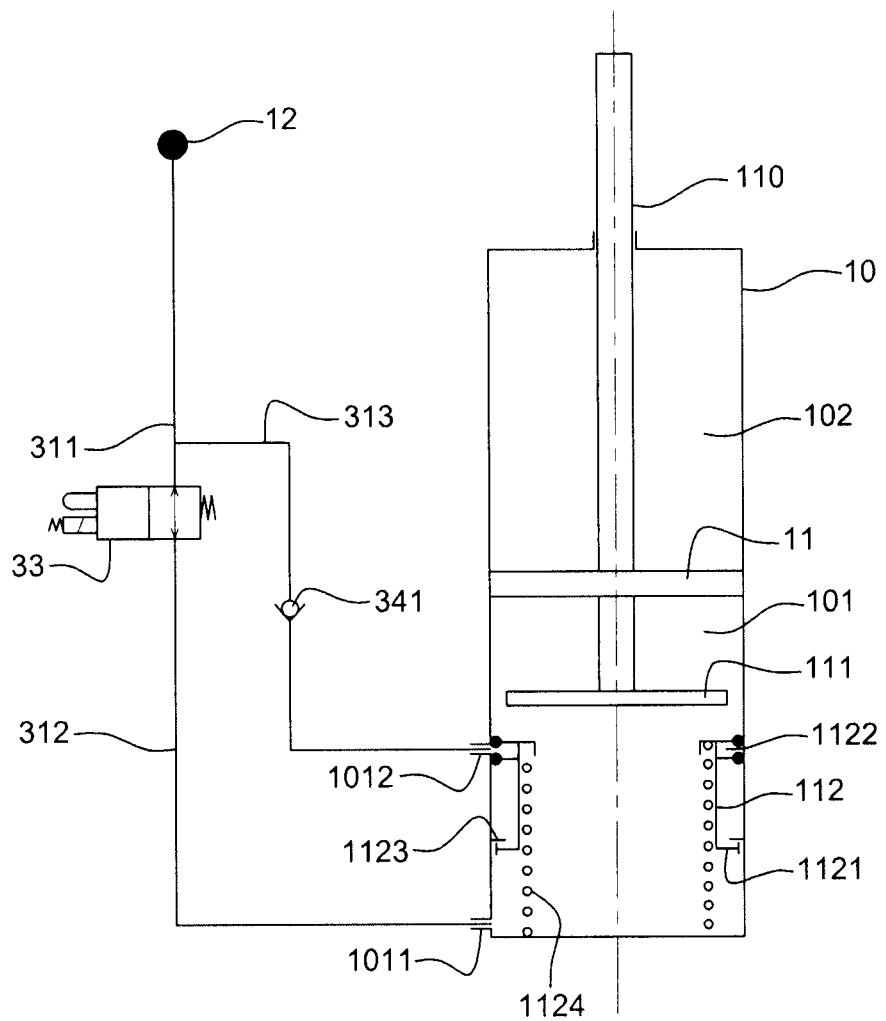

In FIG. 3, second distributor (33) is represented in its "electrically supplied" state. While piston (11) continues its travel, bushing (112) becomes immobilized in translation against axial stop (1123) and is maintained in this position by spring-forming means (1124). While movable bushing (112) is maintained in this position, second orifice (1012) is blocked off by leaktight groove (1122) of the said bushing. The piston continues to advance. However, if the electrical supply of distributors (32, 33) is cut off beyond this position, they return to their rest position and the fluid is unable to escape from pressurization chamber (101), either via first orifice (1011), whose connection to the hydraulic circuit is blocked off by second distributor (33), or via second orifice (1012), which in turn is blocked off by leaktight groove (1122) of movable bushing (112). Consequently, the piston remains in position.

Figure 4:
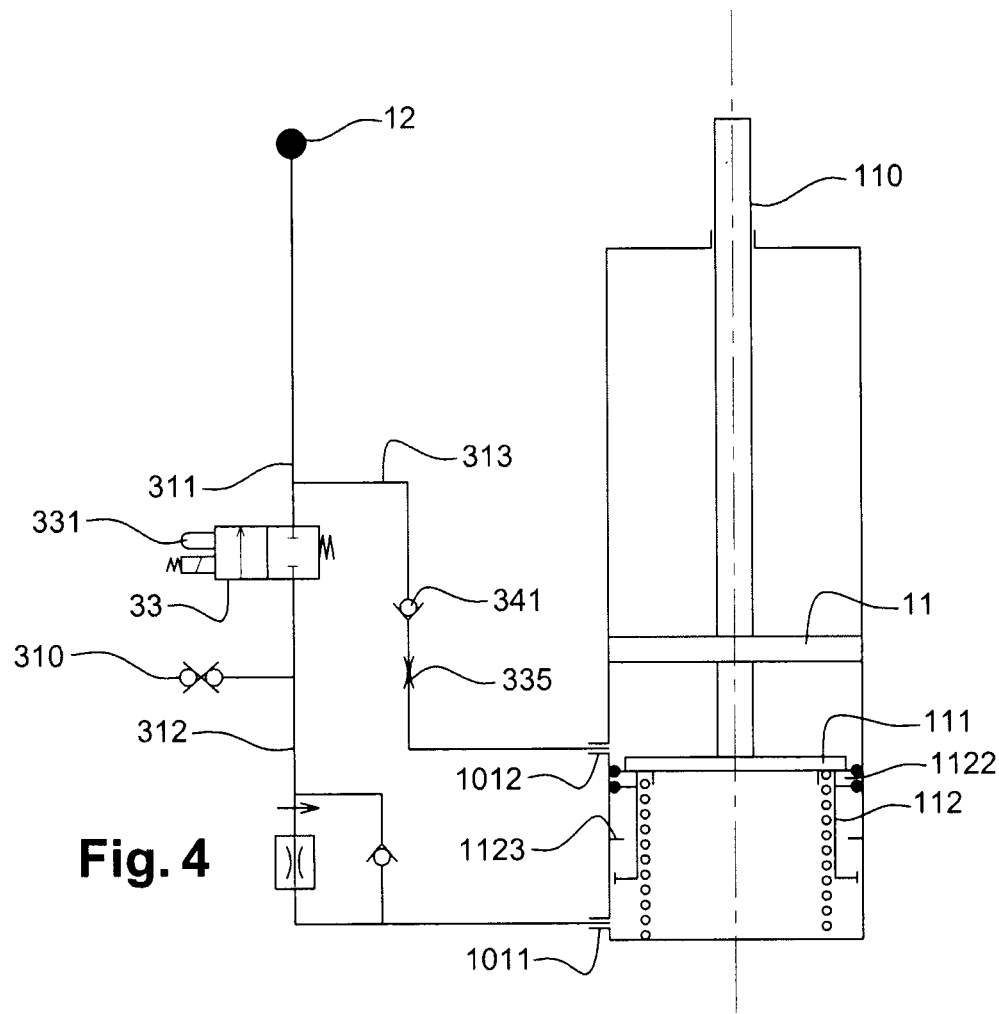
FIG. 4 is a schematic exemplary embodiment of the invention, presented in a safety position and comprising means permitting manual control of the cylinder.

In FIG. 4, on the other hand, if the electrical supply is cut off while bushing (112) has not yet been stopped by the axial stop, the fluid is unable to escape from pressurization chamber (101) via first orifice (1011), whose connection to circuit (312) is obstructed by second distributor (33), which has returned to its starting position, but the said chamber is able to be evacuated via second orifice (1012) and circuit section (313), which places this orifice in communication with coupling (12). The piston descends under the effect of the weight of mass (2), until this comes to rest on its support means (23) in low position (21). In this way it is possible to regulate what is referred to as a safety travel between low position (21) and a shorter or equal distance between the end of travel and the position of movable bushing (112) when this encounters axial stop (1123). When the rod of the cylinder is located in this range, the mass will return systematically to its low position if the system is left at rest.

In practice, this range will be chosen to be very small, equal to a few tens of millimeters at most, to avoid any risk of pinching for objects and persons located in the zone of operation of the cylinder.

Advantageously cylinder (100) comprises means making it possible to maneuver the electrical power independently in case of interruption of input thereof, for example when the device is supplied electrically by batteries and these are discharged.

According to one example of application, FIG. 5, this type of cylinder may be used to maneuver a cowling or a hatch (200). In closed position, FIG. 5A, the weight of the said cowling is absorbed by its linkage (210), which is located in quasi-vertical position and interlocked in a specific device (220). A cylinder according to the invention is used to close and open the said cowling. For opening, the cowling is first unlocked, then the cylinder is supplied with hydraulic pressure, which has the effect of causing translation of piston (11) and opening of hatch (200). When this arrives in high position, FIG. 5B, the electrical supply is cut, the cylinder is immobilized and supports the weight of hatch (200). To close the hatch again, the electrical power of second distributor (33) is re-established, with the effect of placing pressurization chamber (101) of cylinder (100) in communication with tank (30) and causes retraction of the piston under the weight of hatch (200). When the hatch arrives in a position close to interlocked position (210), thruster (111) pushes movable bushing (112), which is still against the stop, with the effect of uncovering second orifice (1012), which also places the pressurization chamber in communication with tank (30). If the electrical supply is cut off, the pressurization chamber then remains in communication with the tank by way of second orifice (1012), even though the circuit extending from first orifice (1011) is blocked off by distributor (33), which has returned to its starting position. An operator may then push on hatch (200) to interlock it.

Such a device is particularly advantageous, for example, for control of opening, closing and interlocking fairings of the thrust inverter of an aircraft engine nacelle.

In addition, for this last application, pressurization chamber (101) being systematically in communication with the tank by way of second orifice (1012) when cowling (200) is in interlocked position, the thermal expansion or contraction of the oil contained in the pressurization chamber in the course of flying phases of the said aircraft does not cause any parasitic force on hatch (200) and on its interlocking device (220).

To be able to reopen the hatch in the absence of electrical supply, a coupling (310) for a manual pump may be advantageously installed on circuit portion (312) connecting second distributor (33) to first orifice (1011). In its closed position, hatch (200) exerts little or no force on the rod of the cylinder, since its weight is absorbed by its linkage (210). The head loss caused by constriction (335) placed at the outlet of second orifice (1012) is sufficient to permit the pressure rise in pressurization chamber (101) to be large enough to bring the piston to safety position (210), where communication between pressurization chamber (101) and second orifice (1012) is obstructed by leaktight groove (1122) of movable bushing (112). The pressure may then rise sufficiently in the pressurization chamber so as to lift hatch (200).

In equally advantageous manner, second distributor (33) may comprise a manual control (331) making it possible to place first orifice (1011) in communication with coupling (12) and tank (30) in the absence of electrical supply and in this way to permit re-lowering of hatch (200).

Figure 6:
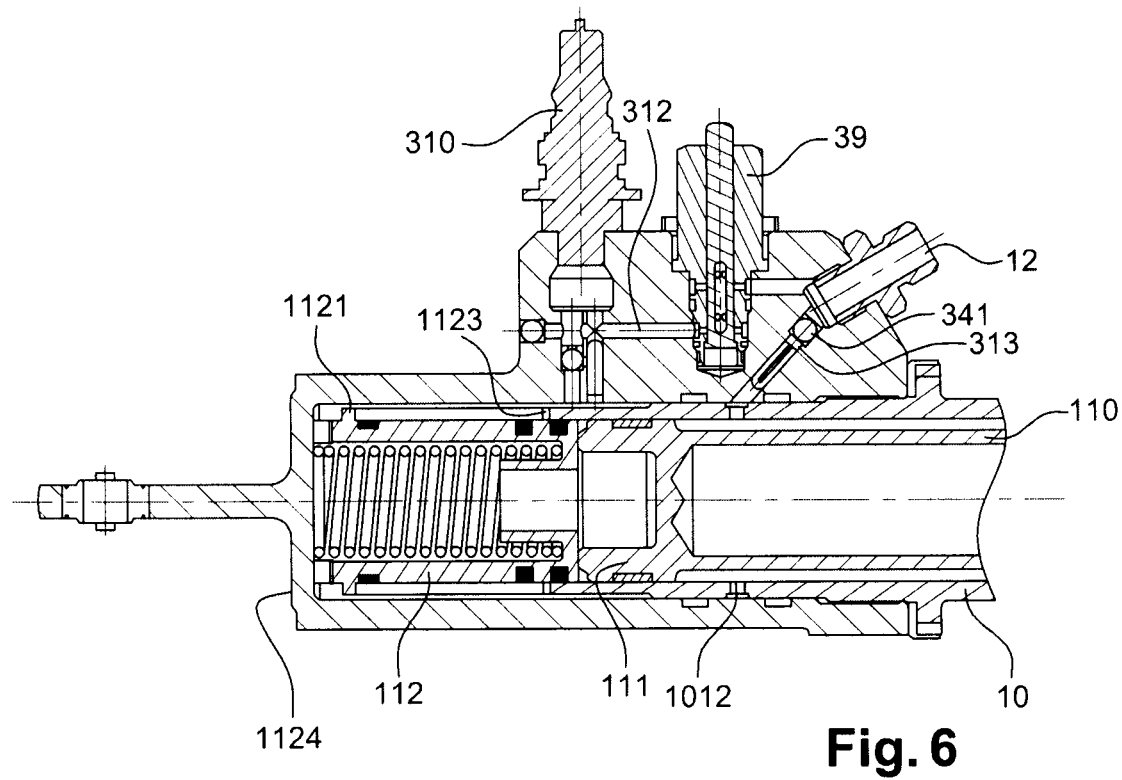

According to one embodiment in FIGS. 6 and 7, all of the functions described in the foregoing are integrated into one block (1000) placed at the end of the body of cylinder (10). To this end a slot (120) is machined at the end of the body of the cylinder, in which slot guides (1121) of movable bushing (112) are able to slide. The end of the said slot forms axial stop (1123) of the bushing. The pressurization chamber is shared between body (10) and end block (1000). This configuration permits very compact installation, particularly suitable for aeronautic applications.

The foregoing description clearly illustrates that, by virtue of its different characteristics and their advantages, the present invention achieves the objectives set for it. In particular, it makes it possible to place the pressurization chamber of the cylinder in communication with the tank beyond a particular position of the rod of the cylinder without jeopardizing the safety of devices equipped with such a cylinder.

The invention claimed is:

1. A single-effect hydraulic cylinder, comprising:
   a pressurization chamber acting on a piston that is displaceable between two positions referred to as end-of-travel positions,
   a first orifice discharging into the pressurization chamber regardless of the position of the piston and configured to place this chamber in communication with a first hydraulic circuit, and the first orifice is always passing, and
   a second orifice discharging into the pressurization chamber regardless of the position of the piston and configured to place this chamber in communication with a second hydraulic circuit, the second orifice is passing for a first range of positions of the piston and is closed for a second range of positions of the piston, and a limit between the first and second ranges is distinct from the ends of travel.

2. A cylinder according to claim 1, further comprising:
   a device configured to close the second orifice regardless of the position of the piston when the pressurization chamber is supplied with pressurized hydraulic fluid via the first orifice.

3. A cylinder according to claim 1, further comprising:
   a coupling configured to place the first and second orifices in communication with a third hydraulic circuit,
   and a switch to switch the first orifice into communication with the coupling.

4. A cylinder according to claim 3, wherein the switch is configured to be controlled manually.

5. An aircraft engine nacelle, comprising:
   a cowling, whose opening and closing are controlled by a cylinder according to any one of the preceding claims.

* * * * *